United States Patent
Fujiwara et al.

(10) Patent No.: US 6,449,310 B1
(45) Date of Patent: Sep. 10, 2002

(54) VIDEO SIGNAL CODING APPARATUS

(75) Inventors: Yuji Fujiwara, Nishinomiya; Masakazu Nishino, Kashiwara; Seiichi Takeuchi, Neyagawa; Kazuhiro Wake, Moriguchi, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/195,668

(22) Filed: Nov. 19, 1998

(30) Foreign Application Priority Data

Nov. 21, 1997 (JP) .............................................. 9-320904

(51) Int. Cl.[7] .................................................. H04N 7/12
(52) U.S. Cl. .............................. 375/240.1; 375/240.26; 386/131; 348/441
(58) Field of Search ...................... 375/240.08, 240.1, 375/240.24, 240.26; 348/441; 382/166; 386/44, 131

(56) References Cited

U.S. PATENT DOCUMENTS 5,905,840 A * 5/1999 Ohtani ........................ 386/44
5,930,386 A * 7/1999 Saito ........................... 382/166
6,144,411 A * 11/2000 Kobayashi et al. ......... 348/441

* cited by examiner

*Primary Examiner*—V. Le
(74) *Attorney, Agent, or Firm*—Smith, Gambrell & Russell, LLP

(57) ABSTRACT

A video signal coding apparatus comprises a divider 102 that divides an input digital video signal into an effective area and an additional area, an effective-area blocking device 103 for dividing the effective area into effective blocks, an effective-area encoder 104 that hight-efficiency-codes the effective blocks to create effective compressed blocks, an additional-area encoder 105 that hight-efficiency-codes the additional area to create additional compressed data, an additional-area blocking device 106 for dividing the additional compressed data into additional compressed blocks each a luminance signal for a plurality of pixels and at least one color difference signal for pixels arranged at the same position as the plurality of pixels, and a substitution device 107 that substitutes the additional compressed blocks for data in the same effective compressed blocks at predetermined positions.

19 Claims, 6 Drawing Sheets

VIDEO SIGNAL CODING APPARATUS

BACKGROUND OF THE INVENTION

1. Field of the Invention

The present invention relates to a video signal coding apparatus for coding a video signal.

2. Description of the Related Art

In recent years, techniques for compressing digital video signals have been developed. A huge amount of funds and labor, however, are required to standardize a compression method and to implement a compression algorithm in hardware (LSI), so attempts are being made to make minor changes in a compression algorithm that has been implemented in hardware using existing standards and commercially available video equipment in order to develop a new video signal coding apparatus.

Figure 5:
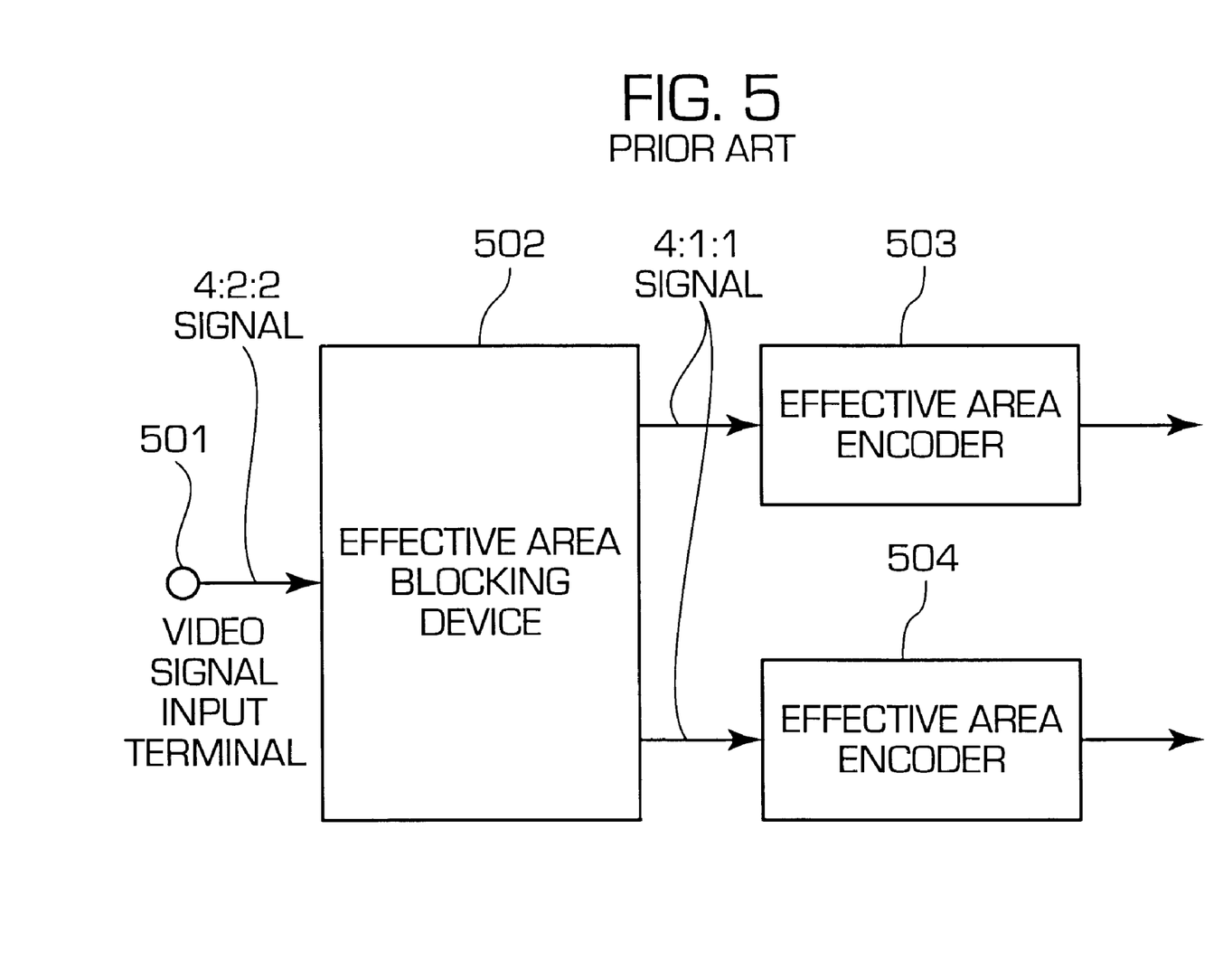
FIG. 5 is a block diagram of a conventional example.

FIG. 5 describes a conventional video signal coding apparatus that codes a 4:2:2 sampling signal using equipment for coding 4:1:1 sampling. The equipment for coding 4:1:1 sampling corresponds to a compression algorithm that has been implemented in hardware using existing standards and commercially available video equipment.

In FIG. 5, 501 is a video signal input terminal that inputs a digital video signal, 502 is an effective-area blocking. device for dividing only the effective area of the input signal into blocks and outputting the blocks to two channels, and 503 and 504 are effective-area encoders that hight-efficiency-codes the blocks in the effective area that have been input. The effective area is simply described. If the digital video signal is transmitted based on, for example, a 525/60 system, all the areas of the video signals within the transmitted signal is composed of 480 main lines and 3 or 7.5 accompanying lines. Herein, the 480 lines are referred to as an effective area and the accompanying lines are referred to as an additional area. Conventional video signal coding apparatuses process only the video signals in the effective area. If the digital video signal is transmitted based on, for example, a 625/50 system, all the areas of the video signals within the transmitted signal is composed of 576 main lines and 9 accompanying lines.

The operation of the conventional video signal encoder of this configuration is described.

A digital video signal with 4:2:2 sampling is input from the input terminal 501. The effective-area blocking device 502 divides only the effective area within the input signal into macro blocks.

During 4:1:1 signal sampling, the macro blocks are composed of four DCT (Discrete Cosine Transform) blocks for a luminance signal that are arranged continuously on a screen in the horizontal direction, and two DCT blocks for color difference signals that are arranged at the same positions of the screen as the four DCT blocks for a luminance signal. During 4:2:2 signal sampling, the macro blocks are composed of two DCT blocks for a luminance signal that are arranged continuously on the screen in the horizontal direction, and two DCT blocks for color difference signals that are arranged at the same positions of the screen as the two DCT blocks for a luminance signal.

Thus, since the number of macro-blocks per frame in a 4:2:2 signal is double that in a 4:1:1 signal, an effective-area encoder that can deal with 4:1:1 signals is adapted for two channels as shown in FIG. 5.

As described above, however, the number of DCT blocks within a single micro block is different between a 4:1:1 signal and a 4:2:2 signal, so the effective-area encoders 503 and 504 for 4:1:1 signals cannot be directly used. Thus, the effective-area blocking device 502 adds to the 4:2:2 signal, two DCT blocks consisting of dummy data so that the number of DCT blocks in a single macro block in the 4:2:2 signal is the same as that in the 4:1:1 signal, thereby enabling the use of the effective-area encoders 503 and 504 for 4:1:1 signals.

Figure 6:
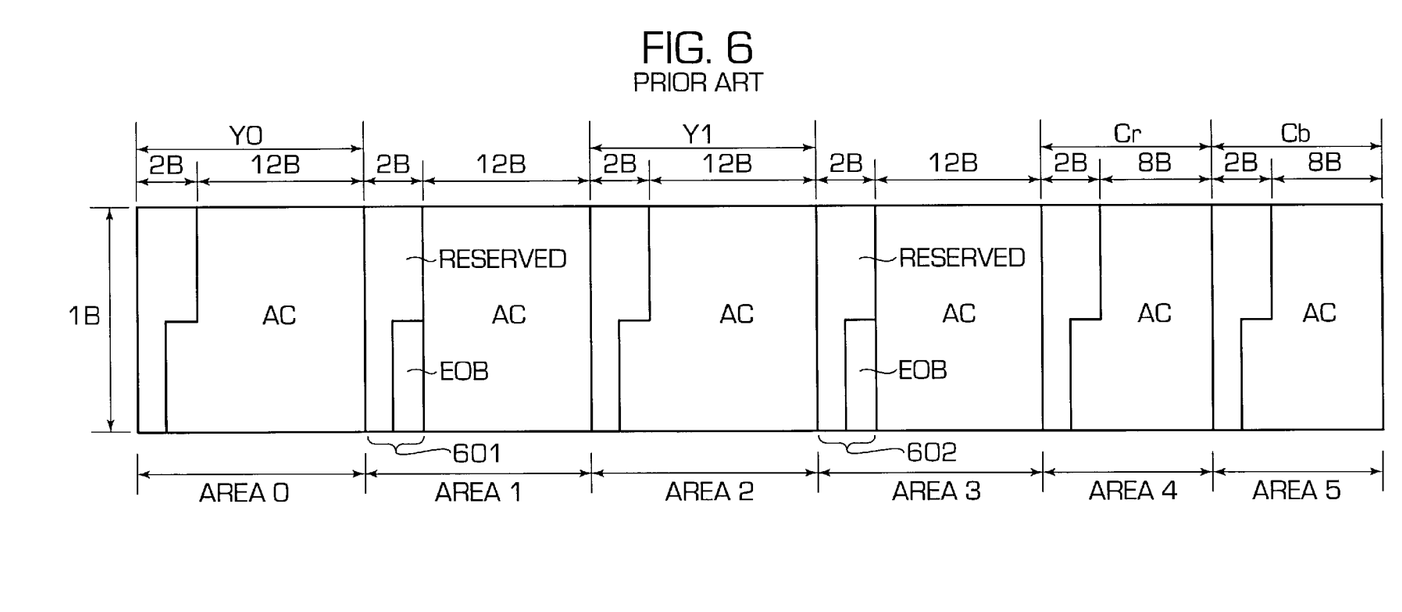
FIG. 6 is an explanatory drawing of a conventional example.

Thus, the effective-area blocking device 502 divides one-frame data into macro blocks including dummy DCT blocks in which all pixel values are the same, further divides the macro blocks for a single frame into two channels, and output the macro blocks to the effective-area encoders 503 and 504. As in the input of the 4:1:1 signal, the effective-area encoders 503 and 504 code the output from the effective-area blocking device 502. FIG. 6 shows a list of data obtained by applying the same coding to the macro blocks of the 4:2:2 signal as in the 4:1:1 signal.

As shown in FIG. 6, coding the 4:2:2 signal essentially uses an area to which are input AC components stored in four areas(e.i. areas 0, 2, 4, and 5) out of the six areas 0 to 5 to which data obtained by coding the 4:1:1 signal is input, and an area to which are input AC components stored in the areas 1 and 3 in which the dummy DCT blocks are recorded.

Since, however, the dummy DCT blocks whose all the data in the DCT blocks has the same pixel value, coding with the DCT blocks provides only DC values and no AC components. Consequently, data obtained by applying VLC (Variable Length Coding) to DCT data consists of only DC components and an EOB that is a coding end code. Thus, in FIG. 6, although 9 DC bits, 3 additional-information bits, and 4 AC bits are normally input to reserved areas 601 and 602, 9 DC bits from the dummy DCT blocks, 3 additional-information bits, and 4 coding end code (EOB) bits are input to these areas if the 4:2:2 signal is dealt with.

The area in which the AC components in the areas 1 and 2 are to be housed is used to record therein AC component data that cannot be stored in the other areas.

BRIEF SUMMARY OF THE INVENTION

Object of the Invention

According to the above method, however, DC values and additional information for the dummy DCT blocks generated during the coding of the 4:2:2 signal are not required to decode a video signal from coded data, so the coded data includes useless data and cannot be efficiently used.

In view of this conventional problem, this invention provides a video signal coding apparatus that can use coded data more efficiently and that can improve the error immunity.

SUMMARY OF THE INVENTION

A first invention of the present invention is a video signal coding apparatus which comprises:

- division means for dividing an input digital video signal into a first and a second areas;
- first blocking means for dividing said first area into the units of first blocks;
- first compression means for hight-efficiency-coding said first block to create a first compressed block;
- second compression means for hight-efficiency-coding said second area to create second compressed data;
- second blocking means for dividing said second compressed data into the units of second compressed blocks each including a luminance signal for a plurality of pixels and at least one color difference signal for pixels arranged at the same position as the plurality of pixels on a screen; and substitution means for substituting said second compressed block for data stored in the same first compressed block at a predetermined position.

This configuration, for example, allows all coded data to be used effectively and inputs to the same block, luminance and color difference signals for a plurality of pixels located at the same position on a screen. Consequently, even if an error occurs, it affects only the plurality of the pixels compared to more pixels in the prior art, thereby substantially improving the error immunity to reduce the adverse effects on image quality during decoding.

A second invention of the present invention is a video signal coding apparatus which comprises:

division means for dividing an input digital video signal into a first and a second areas;

first blocking means for dividing said first area into a plurality of first blocks and dividing the plurality of said first blocks into x (x≧2) channels for output;

first compression means for hight-efficiency-coding said first block to create a first compressed block;

second compression means for hight-efficiency-coding said second area to create second compressed data;

second blocking means for dividing said second compressed data into the units of second compressed blocks including a luminance signal for a plurality of pixels and at least one color difference signal for pixels arranged at the same position as the plurality of pixels on a screen and dividing said plurality of second compressed blocks into said x channels for output; and substitution means operative in each of the x channels for substituting said second compressed block for data stored in the same first compressed block at a predetermined position.

This configuration, for example, enables the same effects as in the first invention to be achieved using a multichannel configuration.

A third invention of the present invention is a video signal coding apparatus which comprises:

division means for dividing an input digital video signal having a 4:2:2 sampling, into a first and a second areas;

first blocking means for dividing said first area into the units of first blocks;

first compression means for hight-efficiency-coding said first block to create a first compressed block;

second compression means for hight-efficiency-coding said second area to create additional compressed data;

second blocking means for dividing said second compressed data into the units of second compressed blocks each including two pixels for a luminance signal and two pixels for color difference signals arranged at the same position as said two pixels on a screen; and substitution means for substituting said second compressed block for data stored in the same said first compressed block at a predetermined position.

This configuration, for example, inputs to the same block, luminance and color difference signals for two pixels located at the same position on a screen. Consequently, even if an error occurs, it affects only the two pixels compared to more pixels in the prior art, thereby substantially improving the error immunity to reduce the adverse effects on image quality during decoding.

A fourth invention of the present invention is a video signal coding apparatus which comprises:

division means for dividing an input digital video signal having a 4:2:2 sampling, into a first and a second areas;

first blocking means for dividing said first area into the units of first blocks;

first compression means for hight-efficiency-coding said first block to create a first compressed block;

second compression means for hight-efficiency-coding said second area to create second compressed data in which each data has 6 bits;

second blocking means for dividing said second compressed data into the units of second blocks each including two pixels for a luminance signal and two pixels for color difference signals arranged at the same position as said two pixels on a screen; and substitution means for substituting the 12 bits of the two pixels for the luminance signal in said second compressed block, for data stored in the same said first compressed block in a predetermined area while substituting the 12 bits of the two pixels for the color difference signals in said second compressed block, for data stored in the same said first compressed block in another area.

This configuration, for example, provides the same effects as the third invention and the image for the added area is originally obtained by compressing 8-bit data into 6 bits, thereby enabling high image quality to be maintained despite decoding.

A fifth invention of the present invention is a video signal coding apparatus comprising: division means for dividing an input digital video signal into a first and a second areas; first blocking means for dividing said first area into the units of first blocks; first compression means for hight-efficiency-coding said first block to create a first compressed block; second blocking means for dividing said second area into the units of second blocks each including a luminance signal for a plurality of pixels and at least one color difference signal for pixels arranged at the same position as the plurality of pixels on a screen; second compression means for hight-efficiency-coding said second block to create second compressed data to output the data as a second compressed block; and substitution means for substituting said output second compressed block for data stored in the same said first compressed block at a predetermined position.

A sixth invention of the present invention is a video signal coding apparatus comprising: division means for dividing an input digital video signal into a first and a second areas; first blocking means for dividing said first area into the units of first blocks; first coding means for coding said first block to create a first coded block; second coding means for coding said second area to create second coded data; second blocking means for dividing said second coded data into the units of second coded blocks each including a luminance signal for a plurality of pixels and at least one color difference signal for pixels arranged at the same position as the plurality of pixels on a screen; and substitution means for substituting said second coded block for data stored in the same said first coded block at a predetermined position.

A seventh invention of the present invention is a video signal coding apparatus comprising: division means for dividing an input digital video signal into a first and a second areas; first blocking means for dividing said first area into the units of first blocks; first compression means for coding said first block into a first coded block; second blocking means for dividing said second area into the units of second coded blocks each including a luminance signal for a plurality of pixels and at least one color difference signal for pixels arranged at the same position as the plurality of pixels on a screen; second compression means for coding said second block to create a second coded data and output it as a second coded block; and substitution means for substituting said second coded block for data stored in the same said first coded block at a predetermined position.

The eighth invention of the present invention is a video signal coding apparatus according to any one of said first to seventh inventions wherein if said input digital video signal is transmitted based on a (1) 525/60 system, said first area has 480 lines while said second area has 7.5 lines, and wherein if said input digital video signal is transmitted based on a (2) 625/50 system, said first area has 576 lines while said second area has 9 lines.

The ninth invention of the present invention is a video signal coding apparatus according to any one of said first to fifth inventions wherein the hight-efficiency-coding executed by said first compression means involves transformation coding and wherein the hight-efficiency-coding executed by said second compression means is non-linear quantization.

EXPLANATION OF REFERENCE NUMERALS

101,201,501; Video signal input terminal
102,202; Divider
103,203,502; Effective-area blocking device
104,204,205,503,504.; Effective-area encoder
105,206; Additional-area encoder
106,207; Additional-area blocking device
107,208; Substitution device

DETAILED DESCRIPTION OF THE PREFERRED EMBODIMENTS

Embodiment 1

Embodiment 1 of this invention is described below with reference to the drawings.

Figure 1:
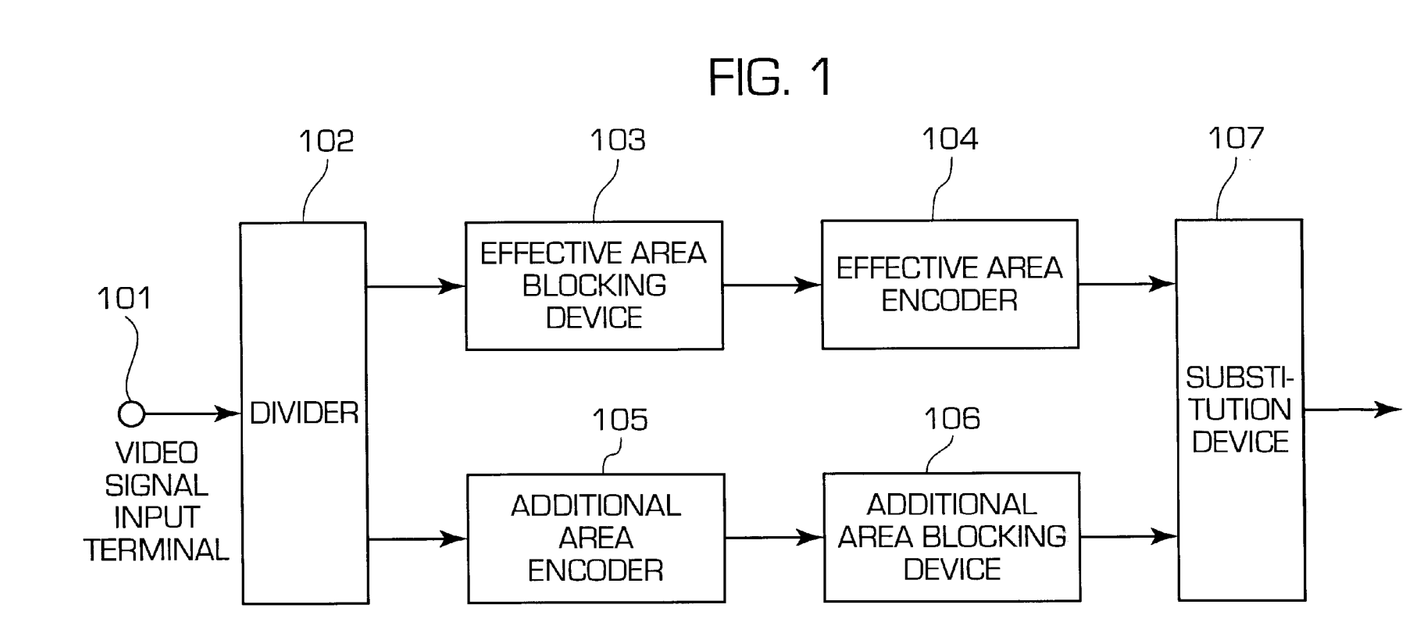
FIG. 1 is a block diagram of Embodiment 1 of this invention.

FIG. 1 describes Embodiment 1 of this invention. Reference numeral 101 designates a video signal input terminal that inputs a video signal, 102 is a divider that divides the input video signal into an effective area and an additional area, 103 is an effective-area blocking device for blocking the effective area of the input video signal in which the conventional video signal recording apparatus can record data, 104 is an effective-area encoder that hight-efficiency-codes the blocked effective area, 105 is an additional-area encoder that hight-efficiency-codes the additional area of the video signal that is different from the effective area, 106 is an additional-area blocking device for blocking the data in the hight-efficiency-coded additional area, and 107 is a substitution device that substitutes the data in effective blocks by the data in the blocks of the additional area. A first and a second areas according to this invention correspond to the effective and additional areas. In addition, first blocking means and first compression means according to this invention correspond to the effective-area blocking device 103 and the effective-area encoder 104, respectively. In addition, second blocking means and second compression means according to this invention correspond to the additional-area blocking device 106 and the additional-area encoder 105, respectively.

The operation of the present video signal coding apparatus of the above configuration is described.

A digital video signal input from the video signal input terminal 101 is divided by the divider 102 into pixels for the effective and additional areas. The pixels for the effective area are blocked by the effective-area blocking device 103, hight-efficiency-coded by the effective-area encoder 104 (using, for example, DCT), and then output to the substitution device 107. The pixels for the additional area are hight-efficiency-coded by the additional-area coding device 105 (using, for example, non-linear quantization), blocked by the additional-area blocking device 106, and then output to the substitution device 107. The substitution device 107 substitutes data that is included in the blocks of the effective area hight-efficiency-coded by the effective-area encoder 104 and that is different from data required during the decoding (not shown) of the coded effective area, by the data in the blocks of the additional area output by the additional-area blocking device 106.

As described above, video signal coding apparatus of the present invention substitutes the data in the effective blocks by the data in the additional area. Thus, if , for example, equipment for coding 4:1:1 signals is used to code 4:2:2 signals, useless data conventionally included in the coded data is substituted by the data for the pixels in the additional area, thereby enabling all the coded data to be used effectively. The useless data refers to data other than those required to decode the coded effective area.

Thus, the conventional coding apparatus dealing with only the effective area can record only the lines (for example, 480 lines) in the effective area of a digital video signal, but according to the configuration of this embodiment, a number of lines in all the areas of a digital video signal specified in a particular standard (for example, 487.5 lines in the case of 525/60 system) can be recorded.

That is, the coding apparatus according to this invention stores the data in the additional area, in the useless area occurring in the conventional coding apparatus, thereby increasing the number of lines that can be decoded. As a result, all effective lines in conformity with the standard can be recorded without the need to produce a new coding apparatus.

According to this invention, similar effects can be provided on signals other than the 4:2:2 signal.

The number of blocks in the additional area according to this invention must only be smaller than or equal to the number of blocks in the effective area.

Embodiment 2

Embodiment 2 of this invention is described below with reference to the drawings.

Figure 2:
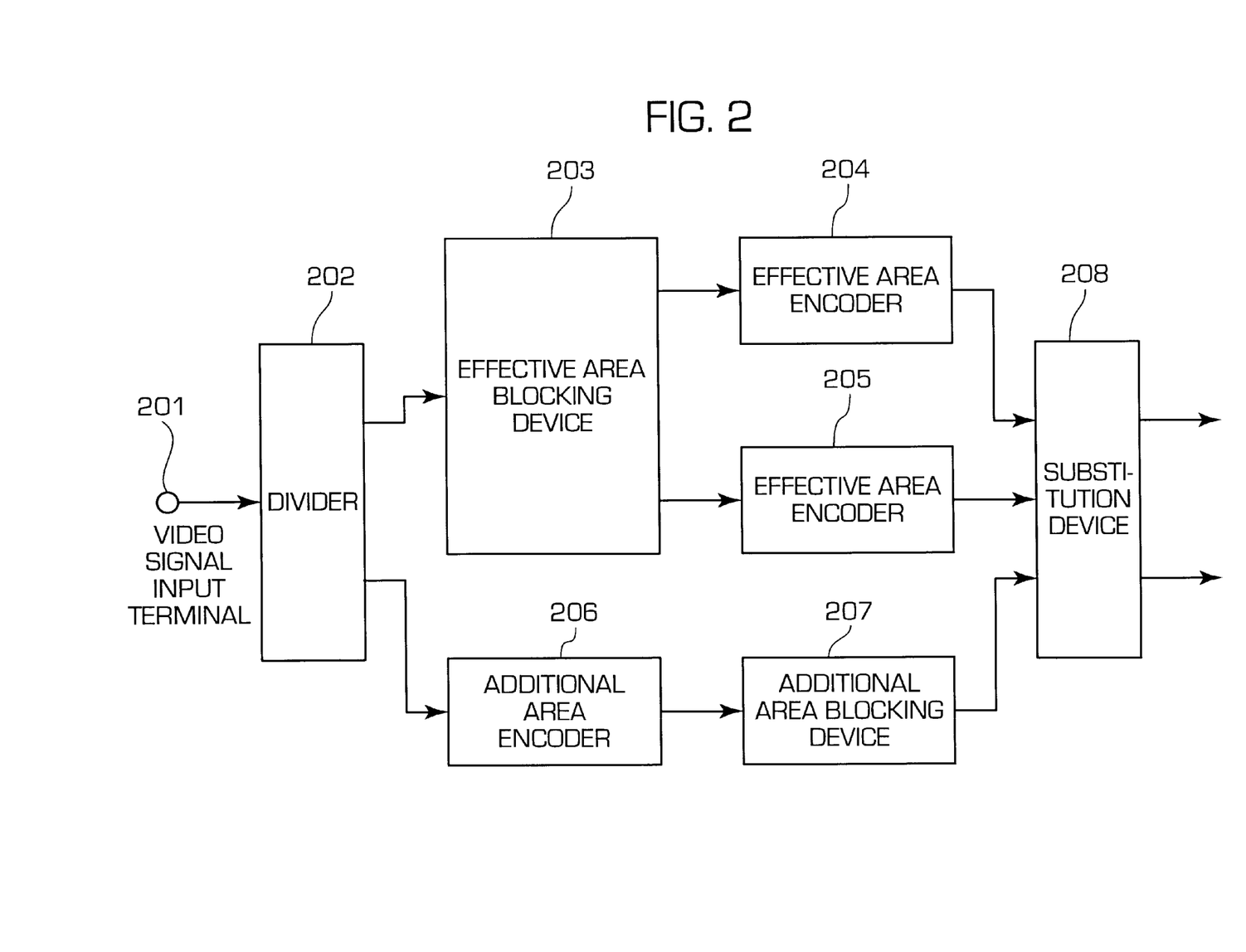
FIG. 2 is a block diagram of Embodiment 2 of this invention.

FIG. 2 describes Embodiment 2 of this invention. Reference numeral 201 designates a video signal input terminal that inputs a video signal, 202 is a divider that divides the input signal, 203 is an effective-area blocking device for blocking the effective area of the input video signal in which the conventional video signal recording apparatus can record data, 204 and 205 are effective-area encoders that hight-efficiency-code the blocked effective area, 206 is an additional-area encoder that hight-efficiency-codes the additional area of the video signal, 207 is an additional-area blocking device for blocking the data in the hight-efficiency-coded additional area, and 208 is a substitution device that substitutes the data in effective blocks by the data in the blocks of the additional area.

The operation of the present video signal coding apparatus of the above configuration is described.

A video signal input from the video signal input terminal 201 is divided by the divider 202 into pixels for the effective and additional areas. The pixels for the effective area are blocked by the effective-area blocking device 203 as in Embodiment 1, but according to this invention, the blocked data is divided into two channels and output to the effective-area encoders 204 and 205, where the data is hight-efficiency-coded (using, for example, DCT) and then output to the substitution device 208. The pixels for the additional area are hight-efficiency-coded by the additional-area encoder 206 (using, for example, non-linear quantization), blocked by the additional-area blocking device 207, and then output to the substitution device 208. The substitution device 208 substitutes the data in the blocks of the additional area for data that is included in the blocks of the hight-efficiency-coded effective area and that is different from data required to decode the coded effective area.

According to this embodiment, the blocks of the effective area are output through two channels. The data in the blocks output from the effective-area encoders 204 and 205 after division into two channels according to a predetermined procedure is substituted for the blocks of the additional area. This procedure must only correspond to a procedure used for decoding (not shown) for subsequent image output, and the procedure for division into two channels may be arbitrary; for example, a single block or a plurality of blocks may be divided at a time.

As described above, the video signal coding apparatus of the present invention can realize the effects as Embodiment 1 even using a multichannel configuration, and is applicable to the use of multiple conventional apparatuses for coding video signals to code high-bit-rate signals.

The channel division according to this embodiment can be extended to a multi channel configuration including three or more channels.

The number of blocks in the additional area per channel according to this invention must only be smaller than or equal to the number of blocks in the effective area.

Embodiment 3

Embodiment 3 of this invention is described below with reference to the drawings.

Figure 3:
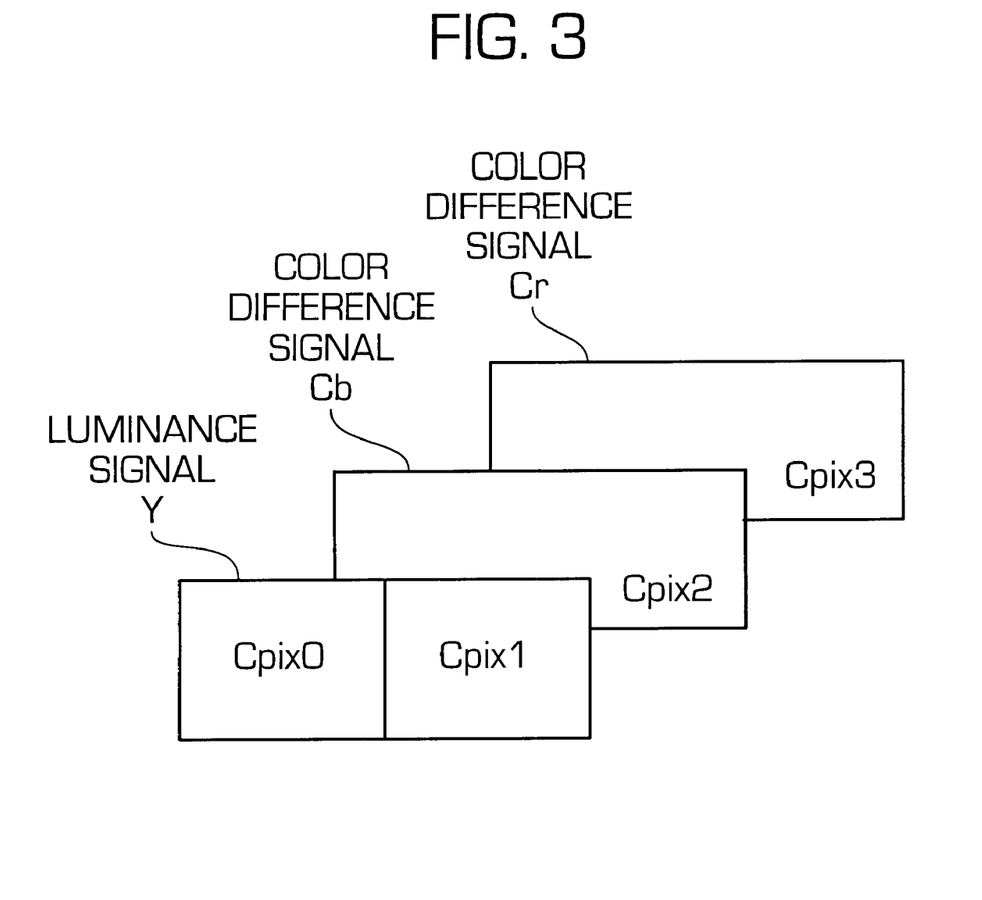
FIG. 3 shows luminance and color difference signals for two pixels arranged at the same position on a screen according to Embodiment 3 of this invention.
Figure 4:
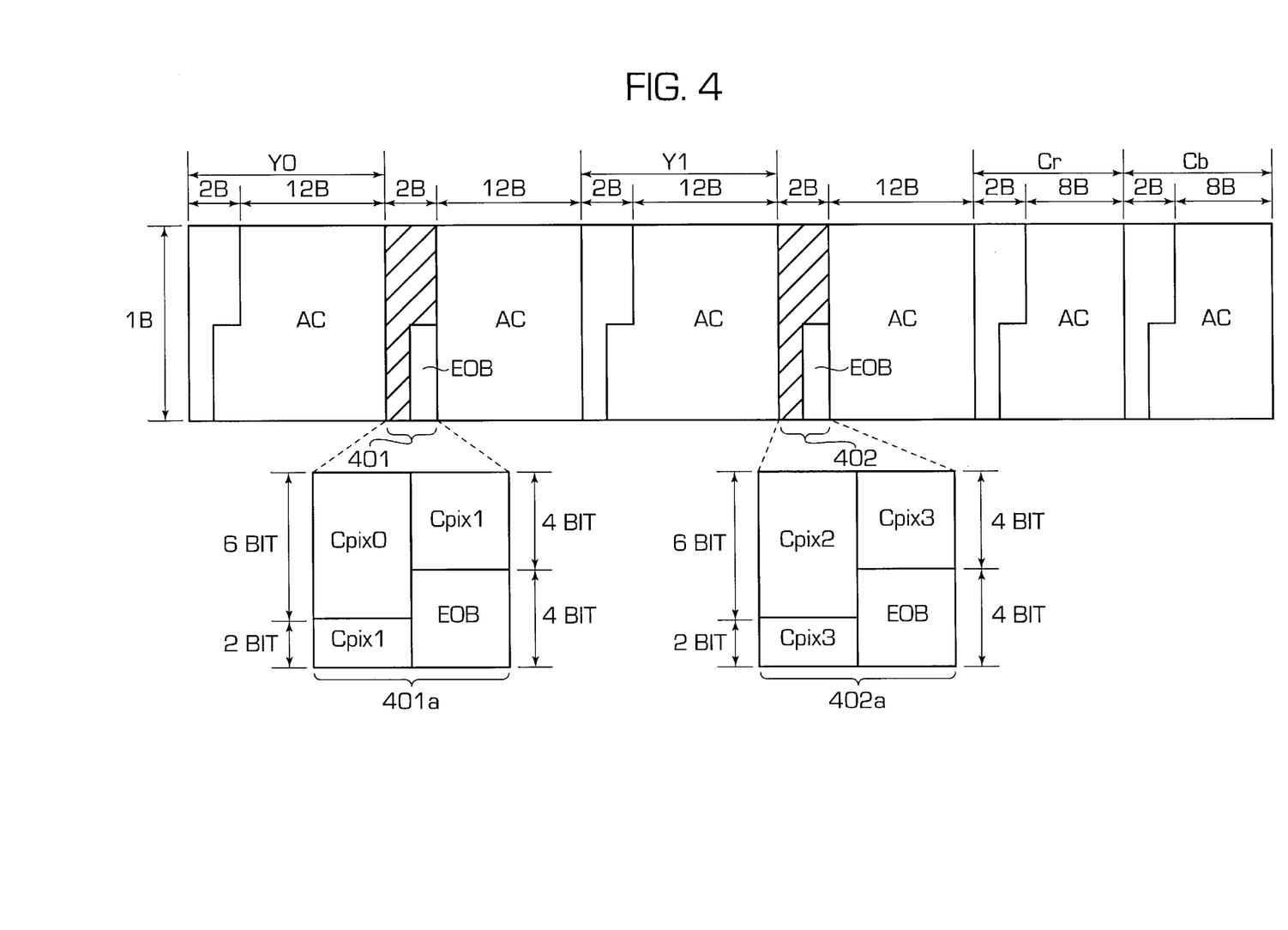
FIG. 4 is an explanatory drawing of the structure of data in a hight-efficiency-coded video signal according to Embodiment 4 of this invention.

The configuration of the video signal coding apparatus of the present invention is the same as in FIG. 1. It is described below with reference to FIG. 1. A video signal with 4:2:2 sampling input from the video signal input terminal 101 is divided by the divider 102 into pixels for the effective and additional areas, as in Embodiment 1. The pixels for the effective area are blocked by the effective-area blocking device 103, hight-efficiency-coded by the effective-area encoder 104, and then output to the substitution device 107, as in Embodiment 1. The additional area is hight-efficiency-coded in the additional-area encoder 105, and output to the additional-area blocking device 106. Since the input signal has 4:2:2 sampling according to this embodiment, the additional-area blocking device 106 forms a single block out of two pixels (Cpix0, Cpix1) for a luminance signal (a Y signal), one pixel (Cpix2) for a color difference signal Cb for a pixel arranged at the same position as the above two pixels on the screen, and one pixel (Cpix3) for a color difference signal Cr for the pixel arranged at the same position as shown in FIG. 3, and then outputs this block to the substitution device 107. This single block corresponds to data blocks 401a and 402a in FIG. 4 described below. The substitution device 107 substitutes data that is included in the blocks of the effective area hight-efficiency-coded by the effective-area encoder 104 and that is different from data required during the decoding (not shown) of the coded effective area, by the data in the blocks of the additional area output by the additional-area blocking device 106. In FIG. 4, the unwanted data corresponds to the data recorded in the areas 401 and 402 prior to substitution. The second block according to this invention corresponds to one block output from the additional-area blocking device 106.

In addition to the same effects as in Embodiment 1, the video signal coding apparatus according to this invention provides the following effects.

As described above, the two pixels (Cpix0, Cpix1) for a luminance signal, the one pixel (Cpix2) for the color difference signal Cb for the pixel arranged at the same position as the above two pixels on the screen, and the one pixel (Cpix3) for the color difference signal Cr arranged at the same position (see FIG. 3) are input to the same block (that is, a data recording area consisting areas 0 to 5, which is shown in FIG. 4). Thus, if an error occurs to prevent one recorded block from being decoded, it affects only the two pixels according to this invention, compared to more pixels in the prior art, thereby substantially improving the error immunity to reduce the adverse effects on image quality during decoding. The pixel that cannot be decoded can be conveniently interpolated by substituting, on the screen, it by the pixel at the same position in the preceding frame and displaying it thereon. The first block according to this invention corresponds to the data recording area consisting of the areas 0 to 5 shown in FIG. 4.

The reason why such a difference occurs is further explained. For example, a configuration is considered in which the two pixels (Cpix0, Cpix1) for the luminance signal, the one pixel (Cpix2) for the color difference signal Cb arranged at the same position as the above two pixels on the screen, and the one pixel (Cpix3) for the color difference signal Cr arranged at the same position are not recorded in the same data recording region. In this case, if, for example, the color difference signals Cb and Cr for the pixels arranged at the different positions on the screen are recorded in the same data recording area, a flaw or dust on the surface of the recording medium (for example, a magnetic tape) may cause an error to hinder the entirety of one data recording area from being decoded, thereby affecting all the pixels at different positions.

The configuration of Embodiment 2 according to this invention is also effective on a multichannel configuration including two or more channels using the configuration of Embodiment 2.

The number of blocks in the additional area according to this invention must only be smaller than or equal to the number of blocks in the effective area.

Embodiment 4

Embodiment 4 of this invention is described below with reference to the drawings.

The configuration of the present video signal coding apparatus is the same as in FIG. 2. It is described below with reference to FIG. 2. A video signal with 4:2:2 sampling input from the video signal input terminal 201 is divided by the divider 202 into pixels for the effective and additional areas, as in Embodiment 2. The pixels for the effective area are blocked by the effective-area blocking device 203, hight efficiency-coded by the effective-area encoders 204 and 205, and then output to the substitution device 208, as in Embodiment 2. In the additional-area encoder 206, each pixel is coded by means of, for example, non-linear quantization so as to have a code length of 6 bits and output to the additional-area blocking device 207.

As in Embodiment 3, the additional-area blocking device 207 forms a single block out of the two pixels (Cpix0, Cpix1) for the luminance signal (a Y signal), the one pixel (Cpix2) for the color difference signal Cb for the pixel arranged at the same position as the above two pixels on the screen, and the one pixel (Cpix3) for the color difference signal Cr for the pixel arranged at the same position as shown in FIG. 3, and then outputs this block to the substitution device 208. This single block corresponds to the data blocks 401a and 402a in FIG. 4.

FIG. 4 shows a substitution method executed by the substitution device 208. The substitution device 208 substitutes the data in the blocks of the additional area for part of that data in the blocks of the hight-efficiency-coded effective area which is recorded in the shaded areas 401 and 402 in FIG. 4. The shaded regions 401 and 402 in FIG. 4 are the same as the reserved areas 601 and 602 in FIG. 6 described in the conventional example, and are substituted for the data output from the additional-area blocking device 207 according to this embodiment. A predetermined area and another area in the first block according to this invention correspond to the areas 401 and 402 shown in FIG. 4.

The substitution method according to this embodiment substitutes the data in the shaded area 401 by the 12 bits in the two pixels (Cpix0, Cpix1) for the luminance signal in the blocks of the compressed additional area, while substituting the data in the shaded area 402 for the 12 bits (the data block 402a in FIG. 4) in the two pixels (Cpix2, Cpix3) for the color difference signals. Although this embodiment divides one block output from the additional-area blocking device 207, into the two data blocks 401a and 402a and records these data blocks in the different areas 401 and 402, both the area 401 and 402 are located in the same data recording area. The pixels to be substituted in FIG. 4 uniquely correspond to the pixels in the block in FIG. 3.

As described above, the video signal coding apparatus according to this invention provides the effects of the first and third inventions. In addition, the image for the added area is obtained by simply compressing original 8-bit data into 6-bit data, thereby enabling high image quality to be maintained despite decoding.

The number of blocks in the additional area according to this invention must only be smaller than or equal to the number of blocks in the effective area, and according to this embodiment, the number of the blocks in the additional area per channel must only be smaller than or equal to the number of the blocks in the effective area.

Although the above embodiment has been described in conjunction with hight-efficiency-coding, this invention is not limited to this aspect and non-compressive coding may be used. In this case, a single pixel originally includes 8 bits, so a 4-byte area is required to record data for 4 pixels as described above. Since the sum of the shaded areas 401, 402 in FIG. 4 including the EOB corresponds to 4 bytes, this case can be dealt with by using part of the AC component recording region as an EOB recording region.

In addition, although the above embodiment has been described in conjunction with the configuration that blocks the additional area after coding, this invention is not limited to this aspect and the additional area may be coded after blocking. In this case, the video signal coding apparatus comprises division means for dividing an input digital video signal into a first and a second areas, first blocking means for dividing the first area into the units of first blocks, first compression means for hight-efficiency-coding the first block to create a first compressed block, second blocking means for dividing the second area into the units of second blocks including a luminance signal for a plurality of pixels and at least one color difference signal for pixels arranged at the same position as the plurality of pixels on a screen, second compression means for hight-efficiency-coding the second block to create second compressed data in order to output this data as a second compressed, block, and substitution means for substituting the second compressed block for data stored in the same first compressed block at a predetermined position. In this case, the additional-area encoders 105 (or 206) and 106 (or 207) described in FIGS. 1 and 2 are inversely arranged. This arrangement provides effects similar to these described above.

Although the first embodiment does not limit the configuration that can improve the error immunity, a configuration may of course be provided in which luminance and color difference signals for a plurality of pixels arranged at the same position on the screen are input to the same block, as in the above embodiments. In this case, the video signal coding apparatus comprises division means for dividing an input digital video signal into a first and a second areas, first blocking means for dividing the first area into the units of first blocks, first compression means for hight-efficiency-coding the first block to create a first compressed block, second compression means for hight-efficiency-coding the second area to create second compressed data, second blocking means for dividing the second compressed data into the units of second blocks each including a luminance signal for a plurality of signals and at least one color difference signal for pixels arranged at the same position as the plurality of pixels on a screen, and substitution means for substituting the second compressed block for data stored in the same first compressed block at a predetermined position. Consequently, even if an error occurs, it affects only the plurality of the pixels, thereby substantially improving the error immunity to reduce the adverse effects on image quality during decoding.

Although the second embodiment does not limit the configuration that can improve the error immunity, a configuration may of course be provided in which luminance and color difference signals for a plurality of pixels arranged at the same position on the screen are input to the same block, as in the above embodiments. In this case, the video signal coding apparatus comprises division means for dividing an input digital video signal into a first and a second areas, first blocking means for dividing the first area into a plurality of first blocks and dividing the plurality of blocks into (x) (x≧2) channels for output, first compression means for hight-efficiency-coding the first block to create a first compressed block, second compression means for hightefficiency-coding the second area to create second compressed data, second blocking means for dividing the second compressed data into the units of second compressed blocks including a luminance signal for a plurality of pixels and at least one color difference signal for pixels arranged at the same position as the plurality of pixels on a screen and dividing the plurality of second compressed blocks into the (x) channels for output, and substitution means operative in each of the (x) channels for substituting the second compressed block for data stored in the same first compressed block at a predetermined position. Consequently, if a multichannel configuration is used and even if an error occurs, it affects only the plurality of the pixels, thereby substantially improving the error immunity to reduce the adverse effects on image quality during decoding.

In addition, although the above embodiments have been described in conjunction with the effective and additional areas, this invention is not limited to this aspect and other areas may be used as the first and second areas.

As described above, according to the above embodiments, if, for example, equipment for coding the 4:1:1 signal is used to code the 4:2:2 signal, the means for substituting coded data enables the pixels for the additional area used during decoding to be substituted for the useless data conventionally present in the coded data that is not required to decode the coded effective area. That is, all coded data can be used effectively, and if the number of lines in the effective area that can be recorded by the conventional effective-area encoder is smaller than that specified in a particular standard, the coding apparatus according to this invention can increase the number of effective lines for recording, thereby enabling all the effective lines specified in the standard to be recorded without the need to produce a new encoder.

As is apparent from the above description, this invention has the advantage of enabling coded data to be used more effectively and improving the error immunity.

What is claimed is:

1. A video signal coding apparatus comprising:
    division means for dividing an input digital video signal into a first and a second areas;
    first blocking means for dividing said first area into the units of first blocks;
    first compression means for hight-efficiency-coding said first block to create a first compressed block;
    second compression means for hight-efficiency-coding said second area to create second compressed data;
    second blocking means for dividing said second compressed data into the units of second compressed blocks each including a luminance signal for a plurality of pixels and at least one color difference signal for pixels arranged at the same position as the plurality of pixels on a screen; and
    substitution means for substituting said second compressed block for data stored in the same first compressed block at a predetermined position.

2. A video signal coding apparatus according to claim 1 wherein if said input digital video signal is transmitted based on a (1) 525/60 system, said first area has 480 lines while said second area has 7.5 lines, and wherein if said input digital video signal is transmitted based on a (2) 625/50 system, said first area has 576 lines while said second area has 9 lines.

3. A video signal coding apparatus according to claim 1 wherein the hight-efficiency-coding executed by said first compression means involves transformation coding and wherein the hight-efficiency-coding executed by said second compression means is non-linear quantization.

4. A video signal coding apparatus comprising:
    division means for dividing an input digital video signal into a first and a second areas;
    first blocking means for dividing said first area into a plurality of first blocks and dividing the plurality of said first blocks into x (x≧2) channels for output;
    first compression means for hight-efficiency-coding said first block to create a first compressed block;
    second compression means for hight-efficiency-coding said second area to create second compressed data;
    second blocking means for dividing said second compressed data into the units of second compressed blocks including a luminance signal for a plurality of pixels and at least one color difference signal for pixels arranged at the same position as the plurality of pixels on a screen and dividing said plurality of second compressed blocks into said x channels for output; and
    substitution means operative in each of the x channels for substituting said second compressed block for data stored in the same first compressed block at a predetermined position.

5. A video signal coding apparatus according to claim 4 wherein if said input digital video signal is transmitted based on a (1) 525/60 system, said first area has 480 lines while said second area has 7.5 lines, and wherein if said input digital video signal is transmitted based on a (2) 625/50 system, said first area has 576 lines while said second area has 9 lines.

6. A video signal coding apparatus according to claim 4 wherein the hight-efficiency-coding executed by said first compression means involves transformation coding and wherein the hight-efficiency-coding executed by said second compression means is non-linear quantization.

7. A video signal coding apparatus comprising:
    division means for dividing an input digital video signal having a 4:2:2 sampling, into a first and a second areas;
    first blocking means for dividing said first area into the units of first blocks;
    first compression means for hight-efficiency-coding said first block to create a first compressed block;
    second compression means for hight-efficiency-coding said second area to create additional compressed data;
    second blocking means for dividing said second compressed data into the units of second compressed blocks each including two pixels for a luminance signal and two pixels for color difference signals arranged at the same position as said two pixels on a screen; and
    substitution means for substituting said second compressed block for data stored in the same said first compressed block at a predetermined position.

8. A video signal coding apparatus according to claim 7 wherein if said input digital video signal is transmitted based on a (1) 525/60 system, said first area has 480 lines while said second area has 7.5 lines, and wherein if said input digital video signal is transmitted based on a (2) 625/50 system, said first area has 576 lines while said second area has 9 lines.

9. A video signal coding apparatus according to claim 7 wherein the hight-efficiency-coding executed by said first compression means involves transformation coding and wherein the hight-efficiency-coding executed by said second compression means is non-linear quantization.

10. A video signal coding apparatus comprising:
- division means for dividing an input digital video signal having a 4:2:2 sampling, into a first and a second areas;
- first blocking means for dividing said first area into the units of first blocks;
- first compression means for hight-efficiency-coding said first block to create a first compressed block;
- second compression means for hight-efficiency-coding said second area to create second compressed data in which each data has 6 bits;
- second blocking means for dividing said second compressed data into the units of second blocks each including two pixels for a luminance signal and two pixels for color difference signals arranged at the same position as said two pixels on a screen; and
- substitution means for substituting the 12 bits of the two pixels for the luminance signal in said second compressed block, for data stored in the same said first compressed block in a predetermined area while substituting the 12 bits of the two pixels for the color difference signals in said second compressed block, for data stored in the same said first compressed block in another area.

11. A video signal coding apparatus according to claim 10 wherein if said input digital video signal is transmitted based on a (1) 525/60 system, said first area has 480 lines while said second area has 7.5 lines, and wherein if said input digital video signal is transmitted based on a (2) 625/50 system, said first area has 576 lines while said second area has 9 lines.

12. A video signal coding apparatus according to claim 10 wherein the hight-efficiency-coding executed by said first compression means involves transformation coding and wherein the hight-efficiency-coding executed by said second compression means is non-linear quantization.

13. A video signal coding apparatus comprising:
- division means for dividing an input digital video signal into a first and a second areas;
- first blocking means for dividing said first area into the units of first blocks;
- first compression means for hight-efficiency-coding said first block to create a first compressed block;
- second blocking means for dividing said second area into the units of second blocks each including a luminance signal for a plurality of pixels and at least one color difference signal for pixels arranged at the same position as the plurality of pixels on a screen;
- second compression means for hight-efficiency-coding said second block to create second compressed data to output the data as a second compressed block; and
- substitution means for substituting said output second compressed block for data stored in the same said first compressed block at a predetermined position.

14. A video signal coding apparatus according to claim 13 wherein if said input digital video signal is transmitted based on a (1) 525/60 system, said first area has 480 lines while said second area has 7.5 lines, and wherein if said input digital video signal is transmitted based on a (2) 625/50 system, said first area has 576lines while said second area has 9 lines.

15. A video signal coding apparatus according to claim 13 wherein the hight-efficiency-coding executed by said first compression means involves transformation coding and wherein the hight-efficiency-coding executed by said second compression means is non-linear quantization.

16. A video signal coding apparatus comprising:
- division means for dividing an input digital video signal into a first and a second areas;
- first blocking means for dividing said first area into the units of first blocks;
- first coding means for coding said first block to create a first coded block;
- second coding means for coding said second area to create second coded data;
- second blocking means for dividing said second coded data into the units of second coded blocks each including a luminance signal for a plurality of pixels and at least one color difference signal for pixels arranged at the same position as the plurality of pixels on a screen; and
- substitution means for substituting said second coded block for data stored in the same said first coded block at a predetermined position.

17. A video signal coding apparatus according to claim 16 wherein if said input digital video signal is transmitted based on a (1) 525/60 system, said first area has 480 lines while said second area has 7.5 lines, and wherein if said input digital video signal is transmitted based on a (2) 625/50 system, said first area has 576 lines while said second area has 9 lines.

18. A video signal coding apparatus comprising:
- division means for dividing an input digital video signal into a first and a second areas;
- first blocking means for dividing said first area into the units of first blocks;
- first compression means for coding said first block into a first coded block;
- second blocking means for dividing said second area into the units of second coded blocks each including a luminance signal for a plurality of pixels and at least one color difference signal for pixels arranged at the same position as the plurality of pixels on a screen;
- second compression means for coding said second block to create a second coded data and output it as a second coded block; and
- substitution means for substituting said second coded block for data stored in the same said first coded block at a predetermined position.

19. A video signal coding apparatus according to claim 18 wherein if said input digital video signal is transmitted based on a (1) 525/60 system, said first area has 480 lines while said second area has 7.5 lines, and wherein if said input digital video signal is transmitted based on a (2) 625/50 system, said first area has 576 lines while said second area has 9 lines.

* * * * *